(12) United States Patent
Gothe et al.

(10) Patent No.: US 6,269,131 B1
(45) Date of Patent: Jul. 31, 2001

(54) PHYSICAL CHANNEL ESTIMATOR

(75) Inventors: Marlo Rene Gothe, Vancouver (CA); Nino Pietro Ferrario, Sunnyvale; Claudio Gustavo Rey, Morgan Hill, both of CA (US); Ognjen Katic, Vancouver (CA)

(73) Assignee: Glenayre Electronics, Inc., Charlotte, NC (US)

( * ) Notice: Subject to any disclaimer, the term of this patent is extended or adjusted under 35 U.S.C. 154(b) by 0 days.

(21) Appl. No.: 09/086,974

(22) Filed: May 28, 1998

(51) Int. Cl.$^7$ .................................................. H04B 15/00
(52) U.S. Cl. ........................... 375/346; 375/229; 375/285
(58) Field of Search .................................... 375/232, 233, 375/262, 340, 341, 346, 348, 229, 285

(56) References Cited

U.S. PATENT DOCUMENTS

| | | | |
|---|---|---|---|
| 4,701,936 | * 10/1987 | Clark et al. | 375/232 |
| 4,882,737 | 11/1989 | Dzung . | |
| 5,003,555 | * 3/1991 | Bergmans | 375/233 |
| 5,214,672 | * 5/1993 | Eyuboglu et al. | 375/254 |
| 5,249,200 | 9/1993 | Chen et al. . | |
| 5,301,167 | * 4/1994 | Proakis et al. | 367/134 |
| 5,414,734 | 5/1995 | Marchetto et al. . | |
| 5,418,818 | 5/1995 | Marchetto et al. . | |
| 5,432,816 | * 7/1995 | Gozzo | 375/232 |
| 5,513,215 | 4/1996 | Marchetto et al. . | |
| 5,533,063 | 7/1996 | Mitra et al. . | |
| 5,537,438 | 7/1996 | Mourot et al. . | |
| 5,596,607 | * 1/1997 | Larsson et al. | 375/340 |
| 5,838,728 | * 11/1998 | Alamouti et al. | 375/265 |
| 5,905,743 | * 5/1999 | Ramesh | 714/795 |
| 5,930,296 | * 7/1999 | Kot | 375/233 |
| 6,026,121 | * 2/2000 | Sadjapour et al. | 375/262 |
| 6,097,770 | * 8/2000 | Bahai et al. | 375/343 |
| 6,151,358 | * 11/2000 | Lee et al. | 375/232 |

OTHER PUBLICATIONS

Lee, H.–N. and Pottie, G.J., "Channel Estimation Based Adaptive Equalization/Diversity Combining for Time–Varying Dispersive Channels," *IEEE*, 47th Vehicular Technology Conference, 1997, pp. 884–888.

Crozier et al., *Least Sum of Squared Errors (LSSE) Channel Estimation*, IEE Proceedings, F, vol. 138, No. 4, pp. 371–378, Aug., 1991.

* cited by examiner

*Primary Examiner*—Young T. Tse
(74) *Attorney, Agent, or Firm*—Christensen O'Connor Johnson Kindness PLLC (57) ABSTRACT

A physical channel estimator for a communication system using pilot symbols and an equalizer uses a model of the system in which the impulse response of the physical channel is considered separately from the impulse responses of the pulse shaping filters in the transmitter and receiver of the communication system. The system is modeled as if the signals were propagated first through both pulse shaping filters and then through the physical channel. To estimate the physical channel impulse response, known pilot symbols are transmitted and then sampled. The pilot symbol samples and the known impulse responses of the pulse shaping filters are then used to estimate the physical channel impulse response. In one embodiment, the physical channel impulse response is considered time-invariant over the estimation period and a sufficient number of pilot symbol samples are taken so that the system is overdetermined. A least squares method is then used to estimate the physical channel impulse response from the pilot symbol samples and the known responses of the pulse shaping filters. Further refinements include conditioning the estimated physical channel impulse response to improve performance in low SNR conditions and estimating a DC offset incurred from demodulating the received signal.

53 Claims, 4 Drawing Sheets

(PRIOR ART)

Fig. 1

(PRIOR ART)

PHYSICAL CHANNEL ESTIMATOR

FIELD OF THE INVENTION

The present invention relates to communication systems and, more particularly, to wireless digital communication systems that include an equalizer.

BACKGROUND INFORMATION

Figure 1:
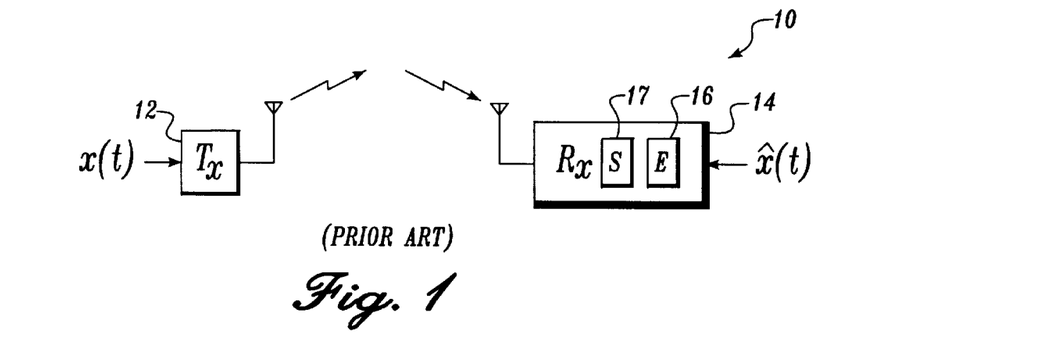
FIG. 1 is a diagram illustrative of a wireless communication system using equalization.

Some digital communication systems use equalization to increase accurate detection of transmitted symbols in the presence of intersymbol interference (ISI). Such systems often use "pulse shaping" so that the resulting pulses have a zero value at the symbol interval (e.g., a Nyquist pulse). Pulse shaping ideally, in the absence of channel distortion, prevents sequences of pulses from interfering with each other when being sampled. For example, the shaping may be configured to achieve Nyquist pulses, which are well known. Channel distortion, for example, due to the receipt of the transmitted signal over multiple paths with different delays, causes ISI even when Nyquist pulses are transmitted. Equalization is required to compensate for this ISI so that the transmitted symbols are accurately detected. Such equalization and pulse shaping systems are well known (see for example, U.S. Pat. Nos. 5,414,734 and 5,513,215 for a discussion of equalization and Proakis, DIGITAL COMMUNICATIONS, third edition, McGraw-Hill, 1995 for a discussion of pulse shaping). FIG. 1 is a simplified diagram illustrative of a system 10 that uses pulse shaping and equalization.

System 10 includes a transmitter 12, a receiver 14 with an equalizer 16. System 10 is a wireless digital system in which transmitter 12 broadcasts radiofrequency (RF) signals that are modulated to include digital information. In this system, transmitter 12 receives symbols x(t), which transmitter 12 modulates and broadcasts. Each symbol generally represents one or more bits. For example, each symbol of a sixteen-level quadrature amplitude modulation (QAM) scheme represents four bits.

Receiver 14 then receives, demodulates, and samples the broadcasted symbols. Although omitted from FIG. 1 for clarity, in system 10 receiver 14 generally receives a transmission through more than one transmission path. For example, the multiple paths may be the result of more than one transmitter being used to transmit the signals and/or the transmitted signal from a single transmitter being reflected from nearby structures. Typically, the transmission paths between receiver 14 and the various other transmitters are not equal in length and may be changing over time (due to the receiver being moved while receiving a symbol), thereby resulting in multipath fading and ISI. Equalizer 16 then compensates for ISI as the ISI changes over time. Receiver 14 then outputs the detected symbols $\hat{x}(t)$.

Figure 2:
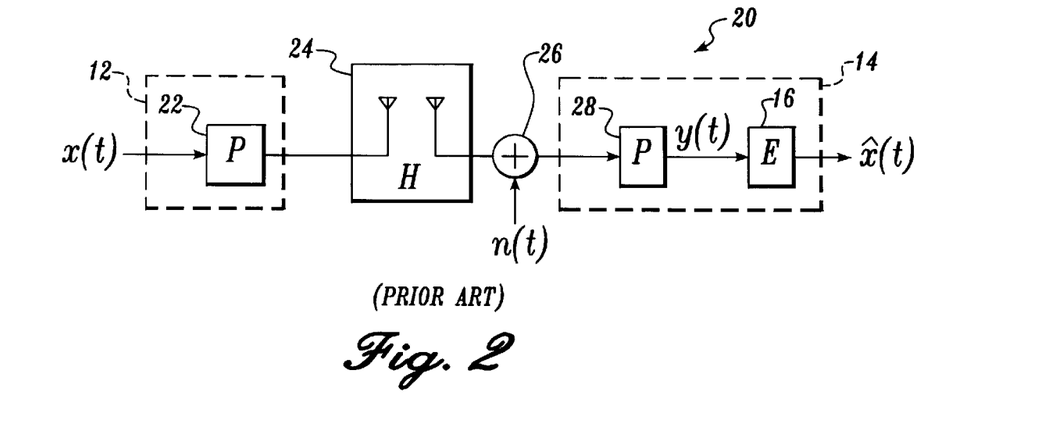
FIG. 2 is a diagram illustrative of a conventional model of the system depicted in FIG. 1.

Equalizer coefficients can be computed from an estimate of the channel response where the channel is modeled as in model 20 in FIG. 2. Equalization, ISI, and fading are discussed in more detail in the aforementioned U.S. Pat. Nos. 5,414,734 and 5,513,215, which are assigned to the same assignee as the present invention.

FIG. 2 is a diagram illustrative of a simplified model 20 of system 10. In this model, transmitter 12 includes a pulse shaping filter 22. Transmitter 12 generally includes several other components besides pulse shaping filter 22 that can influence the shape of the transmitted waveform, and are omitted from this diagram for clarity. Such effects can be modeled as part of pulse shaping filter 22. Also, receiver 14 generally includes other filters and components that are omitted from the diagram, but can be modeled as part of pulse shaping filter 28. Transmitter 12 receives digital information represented by symbols x(t), applies the pulse shaper, and uses the result to modulate a carrier signal.

Model 20 also includes a physical channel 24, which represents the multiple paths of the fading channel (the additional transmitters are omitted for clarity). In model 20, physical channel 24 is modeled as a filter with a time-variant impulse response. The transmitted signal that is "filtered" by physical channel 24 is then received by receiver 14. A summer 26 is included in model 20 to add noise n(t) to the received signal. Receiver 14 includes a pulse shaping filter 28, which outputs a signal y(t) to equalizer 16. Pulse shaping filters 22 and 28 are configured so that the combined filtering results in a Nyquist pulse when there is no channel distortion or transmitter and receiver effects. In this conventional model, system 10 generates signal y(t) according to definition (1) below:

$$y(t) = \{[x(t) * p_t(t) * h(t)] + n(t)\} * p_r(t) \tag{1}$$

where y(t), x(t), $p_t(t)$, h(t), and $p_r(t)$, respectively, represent the output signal of pulse shaping filter 28, the symbol to be transmitted, the impulse response of pulse shaping filter 22, the impulse response of physical channel 24, and the impulse response of pulse shaping filter 28 in the time domain. The symbol "*" indicates the convolution operation.

Some conventional systems (e.g., see Crozier, S. N., Falconer, D. D., Mahmoud, S. A., "Least Sum Of Squared Errors (LSSE) Channel Estimation", *IEE Proceedings-F*, Vol. 138, No. 4, pp. 371–278, August 1991) estimate the overall channel response (i.e., the response due to the pulse shaping filters as well as the physical channel), with symbols x(t) being input into the system. The overall channel is typically modeled as a finite impulse response (FIR) filter, with a predetermined number of coefficients. The number of coefficients is selected to be sufficient to model the channel response without introducing estimation error that significantly affects the performance of the system. In this type of conventional system, the overall channel is modeled according to definition (2) below:

$$G(t,z) = P_t(z) H(t,z) P_r(z) \tag{2}$$

where G(t,z), $P_t(z)$, H(t,z), and $P_r(z)$, respectively, represent the transfer functions of the overall channel response, the pulse shaping filter 22, the physical channel 24 and the pulse shaping filter 28 in the z domain. It will be appreciated by those skilled in the art that the transfer function of physical channel 24 is time variant and, hence, is denoted as a function of both t and z in definition 2. Thus, the overall channel response is also a function of t and z.

To estimate the time-varying coefficients of the FIR filter implementing G(t,z), a sequence of known pilot symbols is transmitted periodically. Because of the periodic insertion of the sequence of pilot symbols into the stream of data symbols, the transmitted signal has a frame structure. Each frame consists of a sequence of pilot symbols, followed by the data symbols until the start of the next pilot sequence.

To estimate the coefficients of the FIR filter implementing G(t,z) at each frame, the received signal corresponding to the pilot sequence is extracted. The error between the output signal predicted by the model and the observed output signal of the actual system is minimized using iterative or least squares minimization methods to adjust the coefficients of the overall channel FIR filter. For example, the aforementioned paper by Crozier et al. uses a least squares estimation method to determine the coefficients of the overall channel FIR filter.

The number of coefficients used in the overall channel FIR filter model is related to the number of pilot symbols required in the estimation. That is, for a given number of coefficients for the overall channel FIR filter model, there is a minimum required number of pilot symbols in the sequence. Generally, the number of pilot symbols in the sequence must be greater than or equal to the number of FIR filter coefficients. Longer pilot symbol sequences decrease the number of data symbols in a frame, thereby decreasing data throughput.

Generally, for time-invariant systems, the accuracy of the estimation increases as the number of pilot symbols used in the estimation increases. However, in a time-varying system such as system 10 (FIG. 1), the accuracy of the estimation tends to decrease as the number of pilot symbols increases because the increased number of pilot symbols occupies a greater timespan, thereby allowing more time for the channel characteristics to change while being estimated. Thus, in selecting the number of coefficients for the overall channel FIR filter, the designer in effect trades error due to estimation for error due to channel variation. Also, because the estimation is typically performed in software by a processor, the computational load on the processor increases as the number of coefficients increases. Accordingly, there is a need for an equalization system that achieves relatively high accuracy with a reduced number of estimated channel coefficients.

SUMMARY

In accordance with the present invention, a physical channel estimator is provided for a communication system using pilot symbols and an equalizer. In one aspect of the invention, the impulse response of the physical channel is considered separately from the impulse responses of the pulse shaping filters in the transmitter and receiver of the communication system. The system is modeled as if the signals were propagated first through both pulse shaping filters and then through the physical channel.

Because the timespan of the physical channel impulse response is typically much less than the timespan of the pulse shaping filter impulse responses, the physical channel can be accurately approximated with an FIR filter having a relatively small number of coefficients (compared to conventional systems that model the overall channel response). This relatively small number of coefficients allows a relatively small number of pilot symbols to be used in estimating the physical channel impulse response, thereby advantageously reducing the time that the physical channel has to vary during the estimation period and freeing more bandwidth for the transmission of data symbols.

To estimate the physical channel impulse response, known pilot symbols are transmitted and the corresponding received signal sampled. The pilot symbol samples and the known impulse responses of the pulse shaping filters are then used to estimate the physical channel impulse response. The physical channel impulse response is considered time-invariant over the estimation period. A sufficient number of pilot symbols are used so that the system is overdetermined and a least squares method is then used to estimate the physical channel impulse response from the pilot symbol samples and the known responses of the pulse shaping filters. The relatively small number of physical channel FIR filter coefficients and pilot symbol samples also advantageously reduces the burden on the processing system implementing the channel estimator.

In another aspect of the present invention, a cost function scheme is used to condition the estimation in the presence of noise in the received signal. In yet another aspect of the present invention, the effect of an inaccuracy (i.e., DC offset) of an analog demodulator in the receiver is incorporated into the estimation of the physical channel impulse response.

BRIEF DESCRIPTION OF THE DRAWINGS

The foregoing aspects and many of the attendant advantages of this invention will become more readily appreciated by reference to the following detailed description, when taken in conjunction with the accompanying drawings.

DETAILED DESCRIPTION

Figure 3:
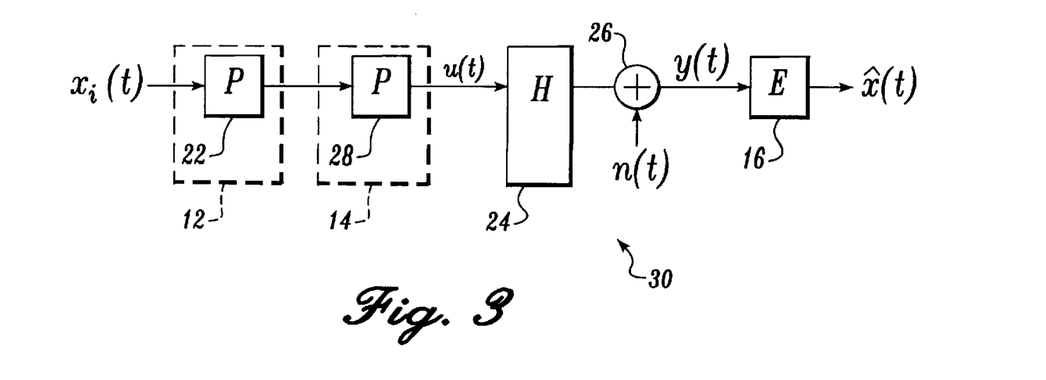
FIG. 3 is a diagram illustrative of a model of the system depicted in FIG. 1, according to one embodiment of the present invention.

FIG. 3 is a diagram illustrative of a model 30 of the system depicted in FIG. 1, according to one embodiment of the present invention. Model 30 is essentially the same as model 20 (FIG. 2), except that the noise n'(t) is pulse shaped and the position of pulse shaping filter 28 is changed from being positioned after physical channel 24 to being positioned between physical channel 24 and pulse shaping filter 22.

Model 30 was developed as follows. Because the transfer functions of the pulse shaping filters are known and time invariant, only the transfer function of physical channel 24 is unknown. Thus, in model 30, only the response of physical channel 24 is estimated. The overall channel response is then determined by the convolution of the estimated physical channel response with the pulse shaping filter responses. In particular, the physical channel response and the receiver pulse shaping filter response are assumed to be commutative so that overall physical channel response is modeled according to definition (3) below:

$$G(t,z)=P_t(z)P_r(z)H(t,z) \qquad (3)$$

where $G(t,z)$, $P_t(z)$, $P_r(z)$, and $H(t,z)$ are described in conjunction with definition (2) above. Definition (3) in effect assumes that the impulse response of physical channel 24 does not change significantly while the pilot sequence is being received.

Using model 30, a methodology for estimating the impulse response of physical channel 24 is developed as follows. As shown in FIG. 3, pulse shaping filter 28 outputs a signal u(t). Signal u(t) can be determined according to definition (4) below:

$$U(z)=P_t(z)P_r(z)X(z) \qquad (4)$$

where U(z) and X(z) are the z transforms of signals x(t) and u(t). Signal u(t) is propagated through physical channel 24 and, thus, the overall channel output signals can be determined according to definition (5) below:

$$y(t)=u(t)*h(t)+n(t) \qquad (5)$$

where h(t) represents the impulse response of physical channel 24 and n(t) represents additive receiver noise.

In one embodiment of the invention, an FIR filter is used to model the impulse response of physical channel 24. Consequently, using a physical channel FIR filter of 2j+1 coefficients, signal y(t) outputted by physical channel 24 can be approximated according to definition (6) below:

$$y(t) = \sum_{m=-j}^{j} h_{t,m\frac{T}{2}} u\left(t - m\frac{T}{2}\right) + n(t) \qquad (6)$$

where $h_{t,mT/2}$ represents one of the samples of the estimated physical channel impulse response at time t. The $h_{t,mT/2}$ samples have T/2 spacing, where T represents the period of time between symbols. In one embodiment, 2j+1 is set to five (i.e., j=2), so that the impulse response of physical channel 24 is approximated by an FIR filter having five coefficients. Thus, the approximated impulse response spans a duration of about 5T/2 or about a maximum of two and one-half symbols. The relatively short timespan of the approximated physical channel impulse response advantageously tends to reduce the effect of assuming a constant physical channel during the estimation period.

For k samples of the received pilot symbols (in T/2 spaced samples), and assuming time invariance during the estimation period, definition (6) may be written in matrix form according to definition (7) below. In one embodiment, k is equal to twenty.

$$\begin{bmatrix} y\left(\frac{T}{2}\right) \\ y\left(2\frac{T}{2}\right) \\ y\left(3\frac{T}{2}\right) \\ \vdots \\ y\left(k\frac{T}{2}\right) \end{bmatrix} = \qquad (7)$$

-continued $$\begin{bmatrix} u\left(\frac{T}{2} - j\frac{T}{2}\right) & u\left(\frac{T}{2} - (j-1)\frac{T}{2}\right) & \cdots & u\left(\frac{T}{2} + j\frac{T}{2}\right) \\ u\left(2\frac{T}{2} - j\frac{T}{2}\right) & u\left(2\frac{T}{2} - (j-1)\frac{T}{2}\right) & \cdots & u\left(2\frac{T}{2} + j\frac{T}{2}\right) \\ u\left(3\frac{T}{2} - j\frac{T}{2}\right) & u\left(3\frac{T}{2} - (j-1)\frac{T}{2}\right) & \cdots & u\left(3\frac{T}{2} + j\frac{T}{2}\right) \\ \vdots & \vdots & \vdots & \vdots \\ u\left(k\frac{T}{2} - j\frac{T}{2}\right) & u\left(k\frac{T}{2} - (j-1)\frac{T}{2}\right) & u\left(k\frac{T}{2} + j\frac{T}{2}\right) \end{bmatrix} \cdot \begin{bmatrix} h_{j\frac{T}{2}} \\ h_{(j-1)\frac{T}{2}} \\ \vdots \\ h_{-j\frac{T}{2}} \end{bmatrix}$$

Definition (7) above can be written as shown in definition (8) below:

$$Y=UH+N \qquad (8)$$

where Y, U, H, and N are y(t), u(t), h(t), and n(t) in vector and matrix form. Then assuming physical channel 24 is time-invariant during estimation, the impulse response of physical channel 24 can then be estimated using least squares estimation methods, such as disclosed in S. Haykin, ADAPTIVE FILTER THEORY, third edition, Prentice Hall, 1996. Using such methods, the impulse response of physical channel 24 can be estimated according to definition (9) below:

$$\hat{H}=(U^*U)^{-1}U^*Y \qquad (9)$$

where $\hat{H}$ represents the estimate of h(t) in matrix form and U* represents the conjugate transpose of matrix U. By defining the quantity $(U^*U)^{-1}U^*$ as matrix R, the estimated physical channel impulse response can be calculated as the product of precomputed matrix R and the vector of received samples. Matrix R can be precomputed because the impulse responses of pulse shaping filters 22 and 28 are known. Thus, definition (9) may be rewritten as definition (10) below:

$$\hat{H}=RY \qquad (10)$$

Model 30 and definitions (6)–(10) may be applied in a communication system similar to system 10 (FIG. 1). A transmitter such as transmitter 12 (FIG. 1) may be used to broadcast the symbols, preferably using a linear modulation scheme. For example, a suitably configured model T9000 transmitter available from Glenayre Electronics, Inc., Charlotte, N.C. may be used.

Figure 4:
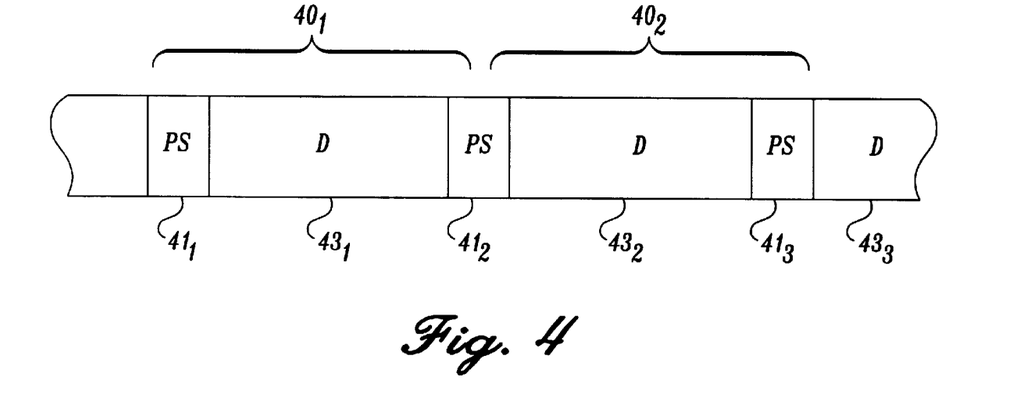
FIG. 4 is a diagram illustrative of a frame, according to one embodiment of the present invention.

As is well known, the symbols to be broadcast can be grouped into frames. FIG. 4 is a diagram illustrative of a frame, according to one embodiment of the present invention. In this embodiment, frames $40_1$, $40_2$, and so on, respectively, include pilot symbol sections $41_1$, $41_2$, and so on. Frames $40_1$, $40_2$, and so on also, respectively, include data symbol sections $43_1$, $43_2$, and so on. In a preferred embodiment, each frame includes twelve pilot symbols and thirty-eight data symbols. The twelve pilot symbols for each frame are each sampled twice, providing twenty-four pilot symbol samples (i.e., the y(t) samples in definition (8) at the receiver. Of these twenty-four samples, the middle twenty received samples are used in Y in definition (10) to estimate the physical channel impulse response. Only the middle twenty samples are used to reduce the effects of "data leakage" from the data symbol sections on either side of the pilot symbol section.

In a preferred embodiment, the pattern of pilot symbols is essentially a full-spectrum signal within the frequency band of the channel being used for the transmission. For example, in a paging application, a channel may be a frequency band of about 25 kHz.

Figure 5:
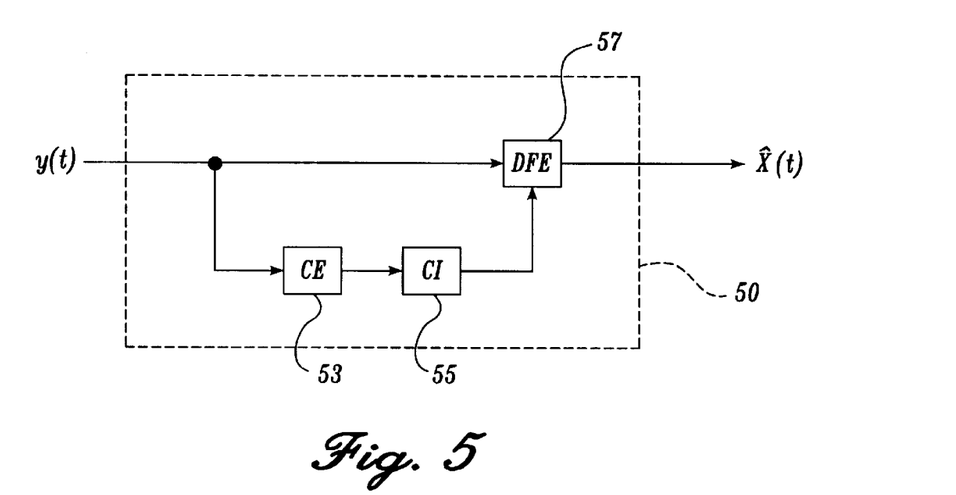
FIG. 5 is a block diagram illustrative of an equalizer employing a physical channel estimator, a physical channel interpolator, and a decision feedback equalizer, according to one embodiment of the present invention.

A receiver then receives and processes (e.g., samples, pulse shapes, etc.) the broadcasted symbols in a manner substantially similar to a conventional system. However, in accordance with the present invention, the channel estimation process, which is part of the equalization process, is based on model 30 (FIG. 3) and definitions (6)–(10). FIG. 5 is a block diagram illustrative of an equalizer 50, according to one embodiment of the present invention. Equalizer 50 includes a physical channel estimator 53, a physical channel interpolator 55, and a decision feedback equalizer circuit (DFE) 57.

In one embodiment, DFE 57 is conventional and, thus, is not further discussed herein. For example, the aforementioned U.S. Pat. No. 5,513,215 discloses a DFE. Physical channel interpolator 55 is preferably implemented, as disclosed in co-pending U.S. Pat. No. 6,173,011 C. Rey and O. Katić entitled "Forward-Backward Channel Interpolator", filed May 28, 1998, and assigned to the same assignee as the present invention. However, in alternative embodiments, any suitable conventional interpolator with linear phase response may be used to implement physical channel interpolator 55.

Figure 6:
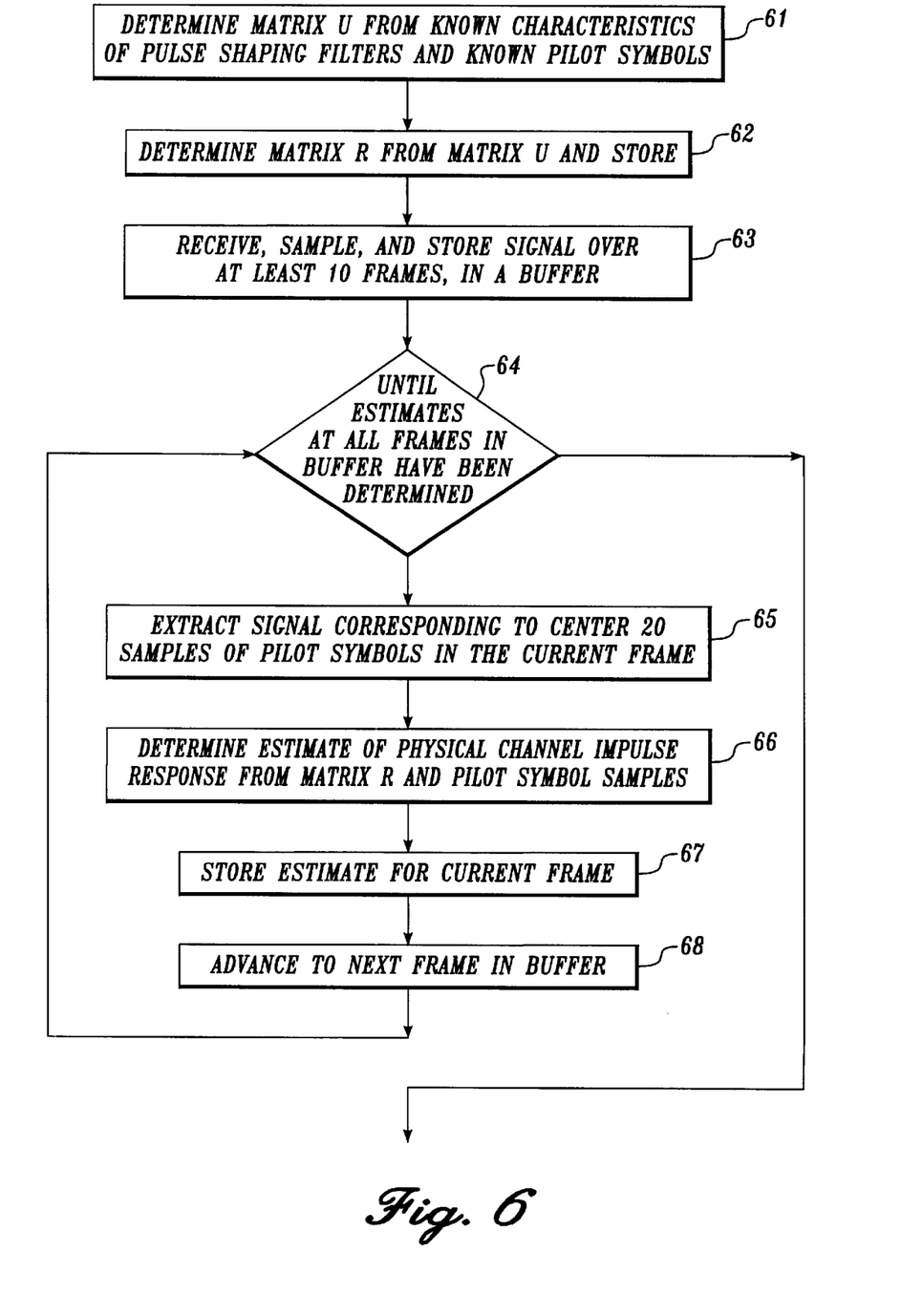
FIG. 6 is a flow diagram illustrative of the operation of a channel estimator, according to one embodiment of the present invention.

In this embodiment, physical channel estimator 53 is implemented with a model 1620 DSP processor available from Lucent Technologies. In a preferred embodiment, the DSP processor has on-chip nonvolatile memory to store software programming to estimate the physical channel impulse response according to the methodology described above in conjunction with FIGS. 3 and 4. FIG. 6 is a flow diagram illustrative of the general operation of physical channel estimator 53, according to one embodiment of the present invention. In this embodiment, a step 61 is first performed in which matrix U, as in definition (7) is determined from the known responses of pulse shaping filters 22 and 28 (FIG. 3). Because this embodiment uses twenty pilot symbol samples and five physical channel FIR filter coefficients, matrix U has twenty rows and five columns.

In a next step 62, matrix R is computed from matrix U according to definitions (9) and (10) above. Matrix R is then stored in a memory that is accessible by the DSP. Once pulse shaping filters 22 and 28 (FIG. 3) are set, matrix R is computed only once and is used in estimating the physical channel impulse response on a frame-by-frame basis. In this embodiment, steps 61 and 62 are precomputed.

In a next step 63, the received signal samples of at least ten frames are stored. A step 64 starts a loop through all of the frames in the buffer. The loop is performed as follows. For each frame, in a step 65, the twenty middle samples of the pilot symbols are extracted. Then in a step 66, the estimated physical channel impulse response is determined by multiplying matrix R with the vector of twenty pilot symbol samples, according to definition (10). The estimated physical channel impulse response is then stored in a step 67 for use by physical channel interpolator 55 (FIG. 5). In a step 68, the loop counter is incremented and the pointer to the buffer is advanced to point to the next frame. After the completion of the loop, the process returns to step 63 to buffer ten more frames. In one embodiment, the buffering process of step 63 for the next "block" of frames is performed while the current "block" of frames is being processed according to steps 64–68.

Figure 7:
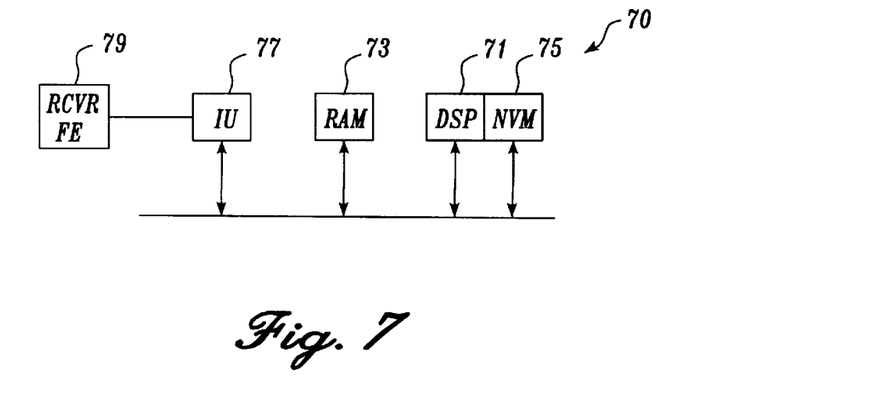
FIG. 7 is a block diagram illustrative of a DSP system used to implement a channel estimator, according to one embodiment of the present invention.

FIG. 7 is a block diagram of a receiver 70 using physical channel estimator 53 according to one embodiment of the present invention. As described above, a DSP 71 executes a software or firmware program to implement physical channel estimator 53. DSP 71 also implements other functional blocks of equalizer 50 (FIG. 5), such as physical channel interpolator 55 and DFE 57. A random-access memory (RAM) 73 is used to store data used in estimating the physical channel impulse response. In this embodiment, a 14 kb DRAM device is used to store data in a memory, such as the received pilot symbol samples, and the estimated coefficients of the physical channel FIR filter. A nonvolatile memory (NVM) 75 (e.g., a read-only memory or ROM device) is used to store the precomputed matrix R from definitions (9) and (10). The nonvolatile memory may be part of the on-chip ROM of DSP 71 or, alternatively, a separate memory device. DSP 71 has access to the signal samples generated by the receiver front end (RCVR FE) 79 through an interface unit (IU) 77.

In an alternative embodiment, a cost function scheme is used to reduce the effect of noise on the physical channel estimate in low signal-to-noise ratio (SNR) environments. Cost function techniques are typically used in regression problems when the matrix is poorly conditioned (e.g., see Hager, APPLIED NUMERICAL LINEAR ALGEBRA, Prentice Hall, 1988). In this embodiment, the cost function of definition (11) below is used:

$$J=(e^*)e+\lambda(H^*)H \qquad (11)$$

where J represents the cost, e represents the error between the estimated output signal $\hat{y}(t)$ and the observed output signal y(t), $\lambda$ is a scalar that represents the weighting of the energy term in the cost function relative to the squared error term, and * represents the conjugate transpose operator. The estimated output signal $\hat{y}(t)$ is determined from the estimated channel response and matrix U (i.e., by multiplying matrix U by $\hat{H}$). Using least squares techniques to minimize the cost function, the physical channel impulse response may be estimated using definition (12) below:

$$\hat{H}=(U^*U+\lambda I_n)^{-1}U^*Y \qquad (12)$$

where $I_n$ represents the identity matrix. Comparing definition (12) with definition (9), it can be seen that this cost function technique adds a diagonal of X to the pilot signal correlation matrix $U^*U$ before the pilot signal correlation matrix is inverted.

It can be shown that this cost function scheme reduces the variance of the estimate of the physical channel impulse response estimate when $\lambda$ is greater than zero, at the expense of introducing a bias in the estimate. This lower estimation variance tends to improve equalizer performance when the signal is received with a low SNR. However, the bias in the estimate tends to degrade equalizer performance when the signal is received with a high SNR.

In one embodiment, the value of $\lambda$ is predetermined to achieve a desired maximum error floor tolerance at the highest expected SNR, thereby improving the performance of the equalizer over the range of SNR of interest. For example, when the maximum expected $$\frac{E_b}{N_o}$$

(energy per bit over noise spectral density) is 30 dB, $\lambda$ may be set to about 0.4. This scheme is advantageously used with systems utilizing error correction coding (ECC) because relatively few errors are expected at high SNR and infrequent errors tend to be more easily correctable. Thus, this cost function scheme advantageously provides higher estimation accuracy at low SNR to achieve improved performance during conditions when it is most needed.

To implement this embodiment of the cost function scheme into physical channel estimator 53 (FIG. 5), definition 10 above (i.e., Ĥ=RY) is used except that matrix R is precomputed according to definition (13) below:

$$R=(U^*U+\lambda I_n)^{-1}U^* \qquad (13)$$

In light of the present disclosure, those skilled in the art can implement embodiments that would select among different precomputed R matrices, each computed with a different value of $\lambda$ according to a measure of the SNR in the received signal.

In another aspect of the present invention, the model of the communication system can be modified to include impairments from other sources. For example, some communication systems use quadrature modulation to increase the throughput of the system. Thus, any inaccuracy in the demodulator may affect the accuracy of the physical channel impulse response estimate. When an analog quadrature demodulator (AQDM) is used in the receiver, a DC offset may be introduced in the in-phase (I) and quadrature (Q) output signals of the AQDM.

Figure 8:
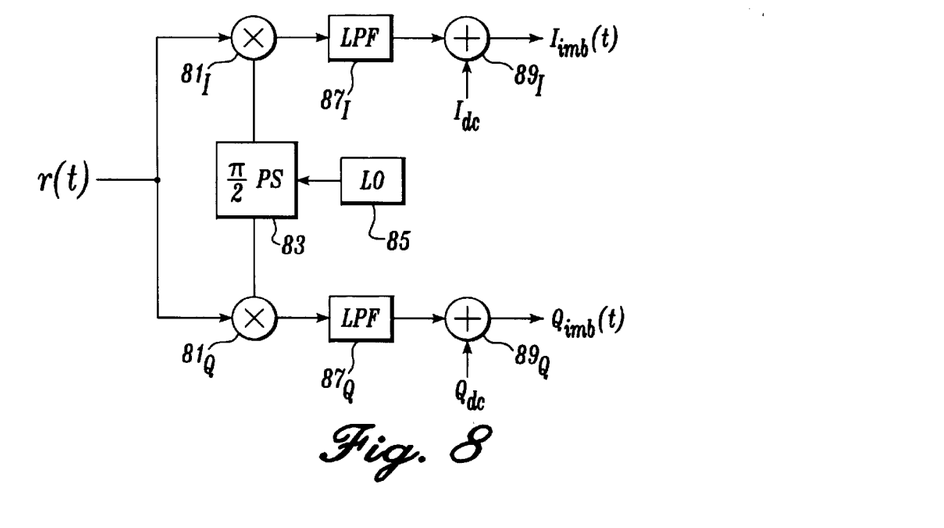
FIG. 8 is a block diagram illustrative of a model of an analog quadrature demodulator with DC offsets.

FIG. 8 is a block diagram of a model 80 of an AQDM, that includes the DC offsets. Model 80 includes mixers $81_I$ and $81_Q$, a phase splitter 83, a local oscillator 85, low-pass filters (LPFs) $87_I$, and $87_Q$, and summers $89_I$ and $89_Q$. A received signal r(t) is provided to mixers $81_I$ and $81_Q$. Mixers $81_I$ and $81_Q$, respectively, then mix the received signal r(t) with signals $2\cos(\omega_c t)$ and $-2\sin((\omega_c t)$ to recover the I and Q components of received signal r(t). The output signals of mixers $81_I$ and $81_Q$ are then filtered by LPFs $87_I$ and $87_Q$ to recover the baseband I and Q component signals. Summers $89_I$ and $89_Q$, respectively, then add DC offsets $I_{dc}$ and $Q_{dc}$ to the output signals of LPFs $87_I$ and $87_Q$, respectively, generate AQDM output signals $I_{imb}(t)$ and $Q_{imb}(t)$.

Referring to FIG. 8, the output signal of the AQDM may be modeled according to definition (14) below:

$$Y_{imb}=y_t+y_{dc} \qquad (14)$$

where $Y_{imb}$ represents the received complex baseband signal at time t, $y_t$ represents the ideal received complex baseband signal at time t, and $Y_{dc}$ represents the complex DC offset. As is well known, the received complex baseband signal can be expressed in complex notation as in definition (15) below:

$$y_t=I_t+jQ_t \qquad (15)$$

where $I_t$ represents the I component of $y_t$, j represents the imaginary number $\sqrt{-1}$, and $Q_t$ represents the Q component of $y_t$. Similarly, the complex DC offset can be represented according to definition (16) below:

$$y_{dc}=I_{dc}+jQ_{dc} \qquad (16)$$

where $y_{dc}$ represents the complex DC offset signal at time t, $I_{dc}$ represents the I component of $y_{dc}$, and $Q_{dc}$ represents the Q component of $y_{dc}$.

The above-described embodiments of physical channel estimator 53 do not account for demodulation inaccuracies in estimating the physical channel impulse response. Thus, using definition (9) may cause inaccuracies in the physical channel estimate because the pilot symbol samples will include distortions from the DC offset.

In a preferred embodiment, least squares techniques are again applied to estimate the DC offset. By applying definitions (8) and (14), the received complex baseband signal may be modeled according to definition (17) below:

$$Y_{imb}=UH+Y_{dc}+N \qquad (17)$$

where $Y_{imb}$ and $Y_{dc}$ are vectors that represent the signal $y_{imb}$ and the DC offset $y_{dc}$, respectively. More specifically, $Y_{imb}$ represents $[y_{imb}(T/2) \ y_{imb}(2T/2) \ \ldots \ y_{imb}(kT/2)]$ for k samples of received signal symbols. To use the least squares estimation techniques, it is assumed that the DC offset remains constant during the estimation period so that the DC offset may be modeled according to definition (18) below:

$$Y_{dc}=C \cdot o \qquad (18)$$

where C is a complex constant representing the DC offsets of the I and Q components, and o is a vector of all ones. By substituting the right-hand side of definition (18) into definition (17), definition (19) below may be used to model the physical channel and AQDM DC offset.

$$Y_{imb}=UH+C \cdot o+N \qquad (19)$$

In one embodiment, the DC offset is estimated and then removed from the complex baseband signal $y_{imb}$ before estimating the physical channel impulse response. Using least squares techniques, C may be estimated according to definition (20) below:

$$\hat{C}=KY_{imb} \qquad (20)$$

where $\hat{C}$ is the estimate of C in definition (18) and K is represented by definition (21) below:

$$K = \frac{o^T \cdot (I_n - U \cdot R)}{\|o\|^2 - o^T \cdot U \cdot R \cdot o} \qquad (21)$$

where T represents the transpose operation and $\|o\|^2$ is represented by definition (22) below:

$$\|o\|=o^T o \qquad (22)$$

It will be appreciated that matrix K can be precomputed and stored. Then for a block of received signal frames, the estimated DC offset $\hat{C}$ can be determined for each pilot sequence in the captured block of frames using definition (20).

In one embodiment, a vector CC is created using m estimates $\hat{C}_i$ (where i=1,2, . . . , m) of the DC offsets that were determined from m frames of data. In the preferred implementation m may be set to ten. Then the average value of vector CC represents a constant DC offset for the whole received block by definition (23) below:

$$\hat{C}_{ave} = \frac{1}{m}\sum_{i=1}^{m} \hat{C}_i \qquad (23)$$

where $\hat{C}_{ave}$ represents the average value of vector CC. $\hat{C}_{ave}$ is subtracted from a vector $Y_{imb}$ (representing a vector of the received signal samples) as represented by definition (24) below:

$$Y=Y_{imb}-\hat{C}_{ave} \qquad (24)$$

where Y represents a vector of the received signal samples without DC offset. Then the baseband received signal Y is used in channel estimator 53. In this manner, the DC offset is advantageously removed from the signal before being processed by the estimator to increase accuracy.

Figure 9:
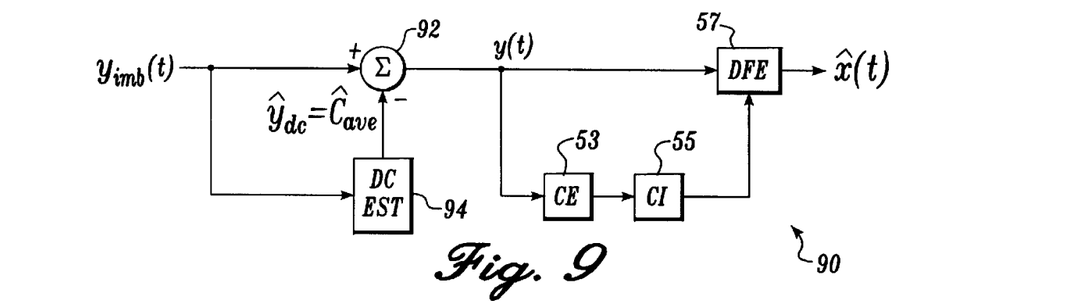
FIG. 9 is a block diagram illustrative of the equalizer of FIG. 5 with analog demodulator DC offset removal, according to one embodiment of the present invention.

FIG. 9 is a block diagram illustrative of an equalizer 90 incorporating the analog demodulator DC offset scheme described above. Equalizer 90 can be used as an alternative to equalizer 50 (FIG. 5). This embodiment of equalizer 90 is substantially similar to equalizer 50 (FIG. 5), but with the addition of a subtractor 92 and a DC offset estimator 94. More specifically, subtractor 92 and DC offset estimator 94 are connected to receive the received signal samples $y_{imb}$. Subtractor 92 is also connected to receive the output sample generated by DC offset estimator 94. CE 53, CI 55, and DFE 57 are connected as in equalizer 50 (FIG. 5), except that they operate on the output sample generated by subtractor 92 instead of received signal samples $y_{imb}$.

Equalizer 90 operates as follows. DC offset estimator 94 is configured to determine $\hat{C}_{ave}$ according to definition (23) above. Subtractor 92 then subtracts $\hat{C}_{ave}$ from the received signal vector $Y_{imb}$ to generate vector Y, according to definition (24). This vector Y is then received by physical channel estimator 53, which then generates the physical channel impulse response estimates as previously described. As a result, accuracy is improved because the DC offset was subtracted from the received signal samples before being used to generate the physical channel impulse response estimates and before being input into DFE 57.

In another embodiment, the estimation of the DC offset and the estimation of the physical channel impulse response are performed simultaneously. Using least squares, H may be estimated according to definition (25) below:

$$\hat{H} = R_2 Y_{imb} \tag{25}$$

where $R_2$ is represented according to definition (26) as:

$$R_2 = R - \frac{R \cdot o \cdot o^T \cdot (I_n - U \cdot R)}{\|o\|^2 - o^T \cdot U \cdot R \cdot o} \tag{26}$$

where o is the aforementioned matrix of ones. Matrix $R_2$ can also be precomputed and stored in memory. Then physical channel estimator 53 would be configured to generate the physical channel impulse response estimates according to definition (25).

Figure 10:
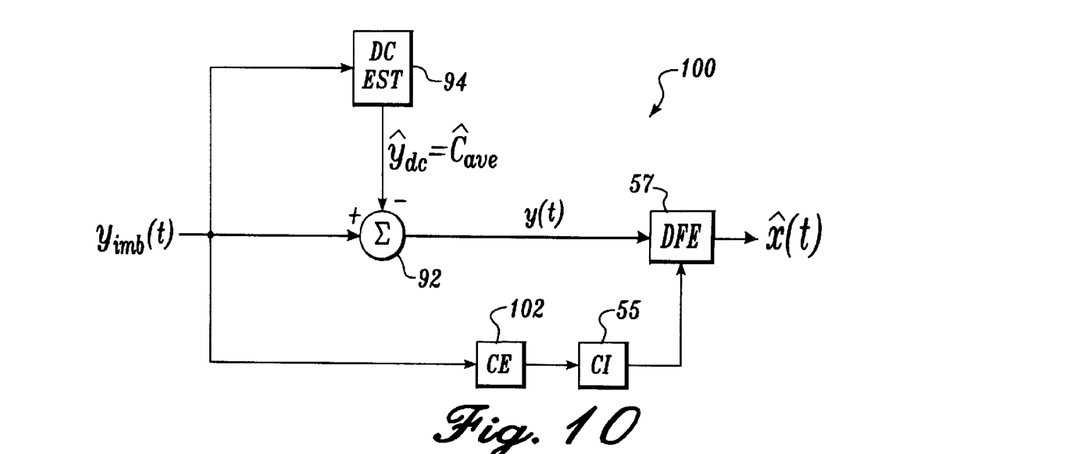
FIG. 10 is a block diagram illustrative of the equalizer of FIG. 5 with analog demodulator DC offset removal, according to another embodiment of the present invention.

FIG. 10 is a block diagram illustrative of an equalizer 100 with analog demodulator DC offset removal, according to another embodiment of the present invention. Equalizer 100 is substantially similar to equalizer 90 (FIG. 9), except that CE 53 is replaced with a CE 102. In addition, CE 102 is connected to receive received signal samples $y_{imb}$ instead of the output samples of subtractor 92 as in equalizer 90. Equalizer 100 determines the DC offset and the estimated channel response simultaneously, in accordance with definitions (20)–(21) and (25)–(26). More specifically, DC offset estimator 94 determines the DC offset according to definitions (20) and (21), while CE 102 concurrently determines the estimated channel response directly from received signal samples $y_{imb}$ according to definitions (25) and (26). Then, the estimated DC offset may be averaged using definition (23) as described above for equalizer 90 and subtracted from the received signal vector $Y_{imb}$ in subtractor 92 to generate vector Y, according to definition (26).

The embodiments of the channel estimator described above are illustrative of the principles of the present invention and are not intended to limit the invention to the particular embodiments described. For example, in light of the present disclosure, those skilled in the art can devise other implementations using different DSPs or general-purpose processors. Other embodiments of the present invention can be adapted for use in communication systems other than the described wireless mobile communication applications. Accordingly, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of implementing an equalizer in a communications system having a transmitter and a receiver, the transmitter configured to transmit signals to the receiver through a channel, the method comprising:

determining an impulse response of a transmitter filter;

determining an impulse response of a receiver filter;

determining an expected response of the transmitter filter and the receiver filter to a sequence of known pilot symbols when the transmitter filter and the receiver filter are coupled in cascade;

transmitting a sequence of pilot symbols from the transmitter to the receiver through the channel;

receiving a signal corresponding to the sequence of pilot symbols;

sampling the received signal corresponding to the sequence of pilot symbols; and estimating an impulse response of the channel as a function of the expected response and the pilot symbol samples.

2. The method of claim 1 wherein a least squares minimization technique is used to generate a regression matrix from the expected response.

3. The method of claim 2 wherein the channel is a time-varying physical channel and the communications system is a mobile wireless communications system.

4. The method of claim 3 wherein the channel is assumed to be time-invariant while the received signal that corresponds to the sequence of pilot symbols is being sampled.

5. The method of claim 4 wherein the channel is modeled as a five-tap finite impulse response digital filter.

6. The method of claim 1 wherein the transmitter and receiver filters are pulse shaping filters.

7. The method of claim 1 wherein the expected response is predetermined to substantially satisfy a first functional relationship U(z)=Pt(z)Pr(z)X(z) where U(z) represents the z-transform of the expected response, Pt(z) represents the transfer function of the transmitter filter, Pr(z) represents the transfer function of the receiver filter, and X(z) represents the z-transform of the pilot symbol sequence.

8. The method of claim 7 wherein the first functional relationship substantially satisfies a second functional relationship $\hat{H}=(U^*U)^{-1}U^*Y$, where $\hat{H}$ represents the estimated impulse response of the channel, U represents in matrix form the expected response in the time domain, where * represents the conjugate transpose operation, and Y represents the received pilot symbol samples in matrix form.

9. The method of claim 8 wherein the term $(U^*U)^{-1}U^*$ is predetermined and stored.

10. The method of claim 8 wherein Y represents a vector of twenty pilot symbol samples taken at twice a symbol transmission rate.

11. The method of claim 1 wherein transmitting the sequence of pilot symbols further includes transmitting a sequence of data symbols, the received signal also corresponding to the sequence of data symbols, and wherein the estimated impulse response is used by the equalizer in detecting the data symbols.

12. A physical channel estimator for use in an equalizer of a communications system, the communications system having a transmitter and a receiver, the transmitter configured to transmit signals to the receiver through a channel, the transmitter having a transmitter filter and the receiver having a receiver filter, the estimator comprising:

means for storing samples of a sequence of received pilot symbols received by the receiver after transmission of the sequence of pilot symbols through the channel;

means for determining an expected response corresponding to a response of the transmitter and receiver filters to a sequence of known pilot symbol samples, the transmitter and receiver filters being coupled in cascade; and means for estimating an impulse response of the channel as a function of the expected response and the stored received pilot symbol samples.

13. The estimator of claim 12 wherein the means for determining the expected response uses a least squares minimization technique to generate a regression matrix from the expected response.

14. The estimator of claim 13 wherein the channel is a time-varying physical channel.

15. The estimator of claim 14 wherein the channel is assumed to be time invariant while the sequence of pilot symbols is being sampled.

16. The estimator of claim 15 wherein the channel is modeled as a five-tap finite impulse response digital filter.

17. The estimator of claim 12 wherein the transmitter and receiver filters are pulse shaping filters.

18. The estimator of claim 12 wherein the expected response is predetermined to substantially satisfy a first functional relationship $U(z)=Pt(z)Pr(z)X(z)$ where $U(z)$ represents the z-transform of the expected response, $Pt(z)$ represents the transfer function of the transmitter filter, $Pr(z)$ represents the transfer function of the receiver filter, and $X(z)$ represents the z-transform of the pilot symbol sequence.

19. The estimator of claim 18 wherein the first functional relationship substantially satisfies a second functional relationship $\hat{H}=(U^*U)^{-1}U^*Y$, where $\hat{H}$ represents the estimated impulse response of the channel, U represents in matrix form the expected response in the time domain, where * represents the conjugate transpose operation, and Y represents the pilot symbol samples in matrix form.

20. The estimator of claim 19 wherein the term $(U^*U)^{-1}U^*$ is predetermined and stored.

21. The estimator of claim 19 wherein Y represents a vector of twenty pilot symbol samples taken at twice a symbol transmission rate.

22. The estimator of claim 12 wherein the means for storing is further configured to store samples of a received signal corresponding to at least one sequence of data symbols, and wherein the equalizer is configured to use the estimated impulse response in detecting the data symbols.

23. A receiver for use in a communication system, the communication system having a transmitter with a transmitter filter, the transmitter being configured to transmit symbols to the receiver through a channel, the transmitter being further configured to periodically transmit a sequence of pilot symbols, the receiver comprising:

a sampler circuit configured to receive and sample a received signal corresponding to symbols transmitted by said transmitter;

a receiver filter coupled to the sampler circuit, wherein the receiver filter is configured to implement a Nyquist filter in conjunction with the transmitter filter; and an equalizer coupled to the receiver filter, the equalizer including a channel estimator, wherein the channel estimator is configured to estimate an impulse response of the channel as a function of an expected response and received pilot symbol samples, the expected response corresponding to a response of the transmitter and receiver filters to a sequence of known pilot symbol samples when the transmitter and receiver filters are coupled in cascade.

24. The receiver of claim 23 further comprising a memory, wherein the equalizer is configured to store a regression matrix determined using a least squares minimization technique from the expected response, the expected response and regression matrix being predetermined and stored in the memory of the receiver.

25. The receiver of claim 24 wherein the channel is a time-varying physical channel and the communication system is a wireless mobile communication system.

26. The receiver of claim 25 wherein the channel is assumed to be time-invariant while the sequence of pilot symbols is being sampled.

27. The receiver of claim 26 wherein the channel is modeled as a five-tap finite impulse response digital filter.

28. The receiver of claim 23 further comprising a processor and memory, wherein the processor is configured to execute a program stored in memory to implement the equalizer.

29. The receiver of claim 23 wherein the expected response is predetermined to substantially satisfy a first functional relationship $U(z)=Pt(z)Pr(z)X(z)$ where $U(z)$ represents the z-transform of the expected response, $Pt(z)$ represents the transfer function of the transmitter filter, $Pr(z)$ represents the transfer function of the receiver filter, and $X(z)$ represents the z-transform of the pilot symbol sequence.

30. The receiver of claim 29 wherein the first functional relationship substantially satisfies a second functional relationship $\hat{H}=(U^*U)^{-1}U^*Y$, where $\hat{H}$ represents the estimated impulse response of the channel, U represents in matrix form the expected response in the time domain, where * represents the conjugate transpose operation, and Y represents the pilot symbol samples in matrix form.

31. The receiver of claim 30 wherein the term $(U^*U)^{-1}U^*$ is predetermined and stored in memory.

32. The receiver of claim 30 wherein Y represents a vector of twenty pilot symbol samples taken at twice a symbol transmission rate.

33. A method of implementing an equalizer in a communications system having a transmitter and a receiver, the transmitter being configured to transmit signals to the receiver through a channel, the method comprising:

determining an impulse response of a transmitter filter;

determining an impulse response of a receiver filter;

determining an expected response of the transmitter filter and the receiver filter to a sequence of known pilot symbols when the transmitter filter and the receiver filter are coupled in cascade;

determining a set of values as a function of the expected response and a set of bias values;

transmitting a sequence of pilot symbols from the transmitter to the receiver through the channel;

sampling a received signal corresponding to the sequence of pilot symbols to form a set of pilot symbol samples; and estimating an impulse response of the channel as a function of the set of values and the set of pilot symbol samples.

34. The method of claim 33 wherein a least squares minimization technique and a cost function technique are used to determine the set of values from the expected response and the set of bias values.

35. The method of claim 33 wherein the channel is a time-varying physical channel.

36. The method of claim 33 wherein the channel is assumed to be time-invariant while the sequence of pilot symbols is being sampled.

37. The method of claim 36 wherein the channel is modeled as a five-tap finite impulse response digital filter.

38. A physical channel estimator for use in an equalizer of a communications system, the communication system having a transmitter and a receiver, the transmitter being configured to transmit signals to the receiver through a channel, the transmitter having a transmitter filter and the receiver having a receiver filter, the estimator comprising:
    means for storing samples of a sequence of received pilot symbols received by the receiver after transmission of the sequence of pilot symbols through the channel;
    means for determining an expected response corresponding to a response of the transmitter and receiver filters to a sequence of known pilot symbol samples, the transmitter and receiver filters being coupled in cascade;
    means for determining a set of values as a function of the expected response and a set of bias values; and
    means for estimating an impulse response of the channel as a function of the set of values and the stored received pilot symbol samples.

39. The estimator of claim 38 wherein the means for determining the set of values uses a least squares minimization technique and a cost function technique to generate a regression matrix from the expected response and the set of bias values.

40. A receiver for use in a communication system, the communication system having a transmitter including a transmitter filter, the transmitter being configured to transmit symbols to the receiver through a channel, the transmitter being further configured to periodically transmit a sequence of pilot symbols, the receiver comprising:
    a sampler circuit configured to receive and sample symbols transmitted by said transmitter;
    a receiver filter coupled to the sampler circuit, wherein the receiver filter is configured to implement a Nyquist filter in conjunction with the transmitter filter; and
    an equalizer coupled to the receiver filter, the equalizer including a channel estimator, wherein the channel estimator is configured to estimate an impulse response of the channel as a function of a set of values and received pilot symbol samples, the set of values being a function of an expected response and a set of bias values, the expected response corresponding to a response of the transmitter and receiver filters to a sequence of known pilot symbol samples when the transmitter and receiver filters are coupled in cascade.

41. The receiver of claim 40 wherein the channel estimator is configured to predetermine the set of values using a least squares minimization technique and a cost function technique on the expected response and the set of bias values.

42. The receiver of claim 41 wherein the set of bias values is predetermined to correspond to an expected maximum signal-to-noise ratio of the received pilot symbol samples.

43. A method of implementing an equalizer in a communications system having a transmitter and a receiver, the transmitter being configured to transmit signals to the receiver through a channel, the method comprising:
    determining an impulse response of a transmitter filter;
    determining an impulse response of a receiver filter;
    determining an expected response of the transmitter filter and the receiver filter to a sequence of known pilot symbols when the transmitter filter and the receiver filter are coupled in cascade;
    determining a set of values as a function of the expected response;
    transmitting a sequence of pilot symbols from the transmitter to the receiver through the channel;
    demodulating and sampling in the receiver a received signal corresponding to the sequence of pilot symbols to form a set of pilot symbol samples;
    estimating an impulse response of the channel as a function of the set of values and the set of pilot symbol samples;
    estimating a DC offset incurred during the demodulation as a function of the set of values and the expected response, the estimated DC offset being a complex constant; and
    subtracting the estimated DC offset from a set of received signal samples.

44. The method of claim 43 wherein a least squares minimization technique is used to determine the set of values from the expected response.

45. The method of claim 43 wherein the channel is a time-varying physical channel.

46. The method of claim 43 wherein the channel is assumed to be time-invariant while the sequence of pilot symbols is being sampled.

47. The method of claim 43 wherein the demodulation is an analog quadrature demodulation.

48. The method of claim 43 wherein the estimated DC offset and the estimated channel impulse response are determined simultaneously.

49. A physical channel estimator for use in an equalizer of a communications system, the communications system having a transmitter and a receiver, the transmitter being configured to transmit signals to the receiver through a channel, the transmitter having a transmitter filter and the receiver having a receiver filter, the estimator comprising:
    means for storing demodulated samples of a sequence of received pilot symbols received by the receiver after transmission of the sequence of pilot symbols through the channel;
    means for determining an expected response corresponding to a response of the transmitter and receiver filters to a sequence of known pilot symbol samples, the transmitter and receiver filters being coupled in cascade;
    means for determining a set of values as a function of the expected response;
    means for estimating an impulse response of the channel as a function of the set of values and the stored received pilot symbol samples;
    means for estimating a DC offset of the demodulated samples as a function of the set of values and the expected response, the estimated DC offset being a complex constant, the DC offset being incurred during demodulation of signal samples in the receiver; and
    means for subtracting the estimated DC offset from a set of received signal samples.

50. The estimator of claim 49 wherein the means for determining the set of values uses a least squares minimization technique to generate a regression matrix from the expected response.

51. A receiver for use in a communication system, the communication system having a transmitter including a transmitter filter, the transmitter being configured to transmit symbols to the receiver through a channel, and being further configured to periodically transmit a sequence of pilot symbols, the receiver comprising:

a demodulator coupled to receive a signal corresponding to the sequence of transmitted symbols from the transmitter, wherein the demodulator is configured to demodulate the received signal to form a demodulated signal;

a sampler circuit coupled to the demodulator, wherein the sampler circuit is configured to sample the demodulated signal to form a sequence of received demodulated symbol samples;

a receiver filter coupled to the demodulator, wherein the receiver filter is configured to implement a Nyquist filter in conjunction with the transmitter filter and to filter the demodulated received symbol samples to form a sequence of filtered demodulated symbol samples; and     an equalizer coupled to the receiver filter, the equalizer including a channel estimator, wherein the channel estimator is configured to:

estimate an impulse response of the channel as a function of a set of values and a set of received filtered demodulated pilot symbol samples, the set of values being a function of an expected response, the expected response corresponding to a response of the transmitter and receiver filters to a sequence of known pilot symbol samples when the transmitter and receiver filters are coupled in cascade; and         estimate a DC offset of the set of filtered demodulated pilot symbols samples as a function of the set of values and the expected response, the estimated DC offset being a complex constant.

52. The receiver of claim 51 wherein the channel estimator is configured to predetermine the set of values using a least squares minimization technique on the expected response and a set of bias values.

53. The receiver of claim 51 wherein the equalizer is configured to subtract the estimated DC offset from a received filtered demodulated symbol sample.

\* \* \* \* \*